June 13, 1950 W. DZUS 2,511,051
FASTENING DEVICE
Filed June 19, 1946
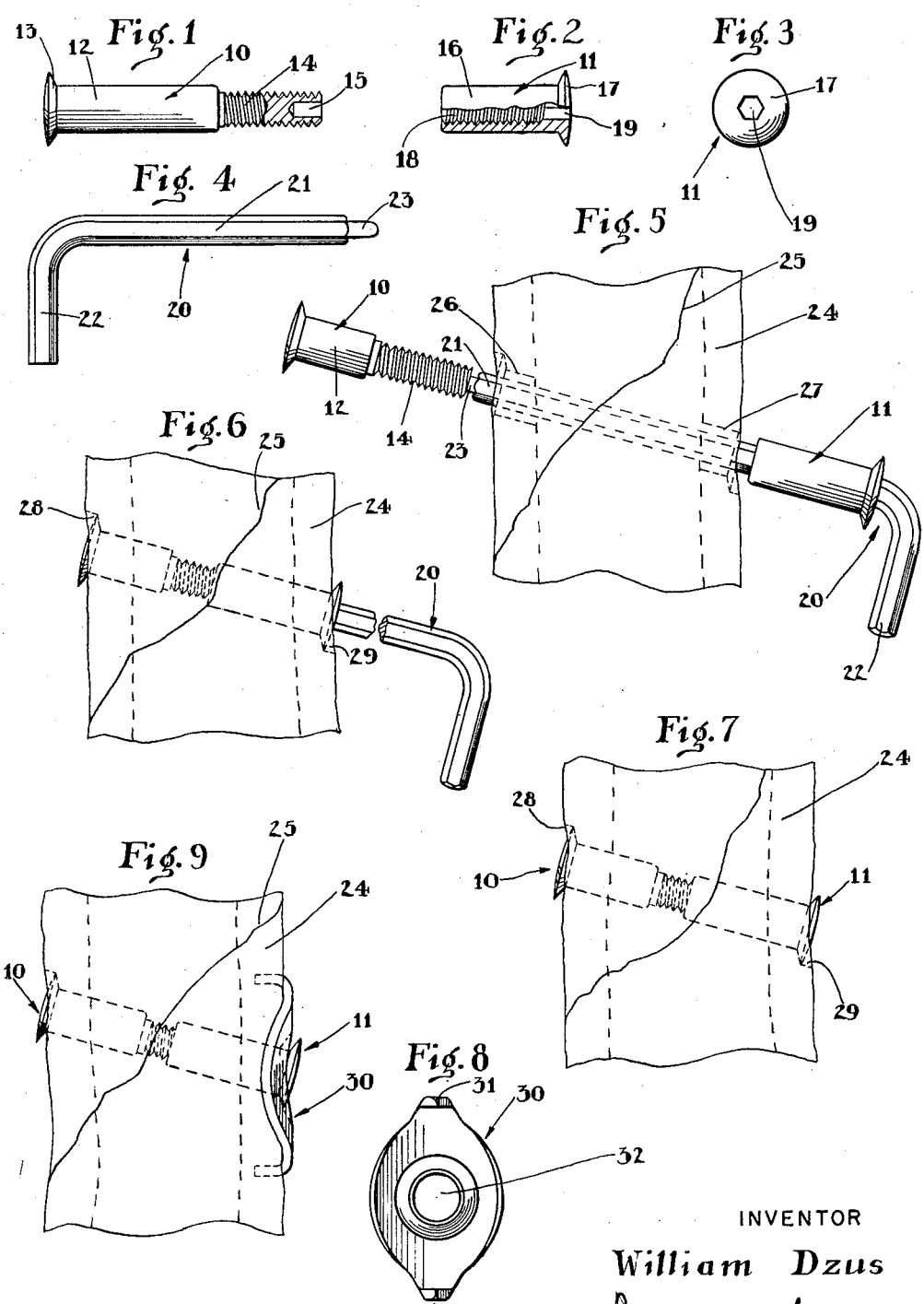
INVENTOR
William Dzus
James H. Kane
ATTORNEY Patented June 13, 1950

2,511,051

UNITED STATES PATENT OFFICE 2,511,051

FASTENING DEVICE

William Dzus, West Islip, N. Y.

Application June 19, 1946, Serial No. 677,775

3 Claims. (Cl. 128—92)

This invention relates to an improved fastening device, particularly a fastening device for use in blind assemblies where the point of assembly cannot be seen.

In using a fastening device consisting of a pair of interengaging fastening members, it is frequently necessary to project them through the parts to be fastened from opposite sides thereof and to assemble the fastener members in the interior of the parts at a point which cannot be viewed by the operator. Under those circumstances it is difficult to bring the fastener members into proper alignment so that they can be assembled.

It is an object of the present invention to overcome these difficulties and to provide an improved fastening device consisting of a plurality of fastening members which may be readily brought into alignment with each other even in blind assemblies so that they may be interengaged.

A further object is the provision of an improved guide and assembling tool for use with a fastening device of the above character whereby the fastener members may be readily brought into proper alignment and interengaged with each other.

In the accompanying drawings:

Fig. 1 is a side view partially in section of one of the fastening members forming part of my improved fastening device;

Fig. 2 is a side view in partial section of the other fastening member in my fastening device;

Fig. 3 is a plan view of the head of the fastening member shown in Fig. 2;

Fig. 4 is a side view of a tool used in assembling my fastening device;

Fig. 5 shows the fastening members being guided into alignment by means of a fastening tool in blind assembly;

Fig. 6 shows the tool being used to interengage and assemble the fastening members;

Fig. 7 is a similar view of the completely assembled fastening device;

Fig. 8 is a bottom plan view of a clip which may be used in connection with the fastening device; and Fig. 9 is a view similar to Fig. 7 showing the clip in use with the fastening device.

My improved fastening device comprises a plurality of interengaging fastening members and in the illustrated embodiment I have shown a pair of fastening members 10 and 11.

The fastening member 10 is shown more particularly in Fig. 1 and is a male fastening member consisting of a shank 12 having a head 13 at one end and an integral projecting threaded stud 14 of reduced diameter at the opposite end. The head may be provided with a conventional kerf or socket (not shown) to receive a screw driver, socket wrench, key or other suitable tool.

The threaded stud portion 14 is provided with a small aperture or socket 15 which is circular in cross-section and which extends inwardly for a short distance from the free end thereof. The purpose of this socket is to receive the reduced end or tip provided on my improved tool as will be later explained.

The fastening member 11 is shown more particularly in Fig. 2 and is a female fastening member having a tubular shank 16 and a head 17 at one end thereof. The shank 16 is provided with a threaded opening 18 of a size to receive and have threaded engagement with the stud 14. Extending through the head 17 is a non-circular socket 19, which in the present instance is of the conventional hexagonal shape. Socket 19 extends through the head portion into the shank 16 where it communicates with the threaded opening 18. The major diameter of the socket is preferably smaller than the minimum diameter of the threaded opening 18 so that the hexagonal shank of my improved tool, which interengages with the socket, may be projected through the socket and through the aperture 18 without engagement or interference with the threaded opening.

It will be appreciated that my fastening device is used by assembling the fastening member 10 with the fastening member 11, and this is accomplished by interengaging the threaded stud 14 with the threaded opening 18 and rotating one member with respect to the other until the desired degree of tightness is obtained.

My fastening device may be used for fastening any type of objects or parts together. However, as previously stated, it is particularly suited for use in blind assemblies where the point of assembly cannot be viewed by the operator. To facilitate this type of assembly, I provide an improved type of tool 20, as shown more particularly in Fig. 4. This tool may be somewhat similar to a socket wrench or key and is provided with a hexagonal shank portion 21 adapted to fit into and to interengage the socket 19. At one end the shank may be provided with a suitable handle, such as indicated at 22, and at the opposite end with a tip 23 of reduced diameter and circular cross-section and of a size adapted to fit into the socket 15 formed in the end of stud 14 and rotate freely with respect thereto.

A typical blind assembly of the fastener is illustrated in Figs. 5, 6 and 7 where I have shown the fastener used for bone surgery in fracture fixation. Thus, I have illustrated a bone 24 having a fracture 25. The central portion of the bone is either hollow or consists of spongy material and it only has a shell of rigid supporting material as indicated in vertical dotted lines. The shell is drilled at an angle from opposite sides as indicated at 26 and 27 so that the fastening device may be disposed at an angle extending across the fracture. If an attempt were made to project the two fastening members 10 and 11 through the apertures 26 and 27, it would be difficult to bring the interengaging ends of the members into alignment at the central portion of the bone due to the fact that this portion of the bone is hollow or spongy and does not serve to guide the members into alignment, and due to the further fact that the point of engagement cannot be seen by the operator.

To facilitate the assembly the shank 21 of the tool is projected through the socket 19 and aperture 18 of the member 11 and then inserted through the apertures 27 and 26 drilled through the bone shell. Thereafter, the tip 23 is inserted into the socket 15 of the member 10 and the two members can then be shifted into position in the apertures 26 and 27 and the end of stud 14 will be brought into engagement with the threaded opening 18. The members are then rotated with respect to each other so as the interengage the members as indicated in Fig. 6, and when the threads have been sufficiently tightened, the tool 20 may be withdrawn, leaving the complete assembly as indicated in Fig. 7. In this connection the tool 20 also serves as a key or wrench and rotation of the tool causes rotation of member 11 while the tip 23 rotates freely in socket 15 of member 10. Naturally, a screw driver or other tool (not shown) may be used to operate member 10.

Where the fastening device is disposed at an angle, or the surface contour of the bone, or other part being fastened is irregular, the heads may be partially countersunk in the part as indicated at 28 and 29.

In certain instances it is desirable to distribute the stresses and strains exerted by the head of the fastening device over a wider area, and for this purpose I provide a suitable clip 30, which is shown more particularly in Figs. 8 and 9. The clip is of generally oval shape and the outer surface thereof is preferably convex and the inner surface concave in cross-section. A pair of depending prongs 31 may be provided at the two ends thereof and a dimpled aperture 32 is formed through the center thereof. The aperture 32 is of a size to accommodate either of the shanks 12 or 16 of the fastening devices 10 and 11 and the dimple is of a size to accommodate the lower portion of either of the heads 13 or 17.

The clip may be used with either or both of the fasteing members. In Fig. 9 I have illustrated it in use with the fastening member 11. In using it, the shank of the fastening member is projected downwardly through the aperture 32. Thereafter, the two fastening members are assembled by means of the tool 20 in the same manner as previously described. The two prongs 31 of the clip may be imbedded in the bone or other part being fastened as shown in Fig. 9 so as to firmly hold it in position.

It will thus be seen I have provided an improved fastening device and also a tool therefor whereby the fastening members may be readily interengaged with each other even in a blind assembly which cannot be viewed by the operator.

While I have illustrated my fastening device in the accompanying drawing, in connection with facture fixation and bone surgery, it should be understood that its use is not limited to bone surgery and that it may be used for fastening together any other objects or parts, particularly in cases of blind assembly.

Modifications may be made in the illustrated and described embodiment of the invention without departing from the invention as set forth in the accompanying claims.

I claim:

1. A fastening device of the type to be assembled with the aid of a guide tool having a non-circular shank and a tip of reduced diameter at the end thereof, comprising a first fastening member formed with a threaded stud and a socket of a size to accommodate the tip extending inwardly at the end of the stud, and a second fastening member in the form of a sleeve with an opening extending completely therethrough, a portion of the opening being circular and threaded and being interengaged with the threaded stud of the first fastening member, and another portion of the opening being non-circular and of smaller diameter and conforming in cross-sectional size and shape with the shank of the guide tool whereby the shank of the guide tool may be inserted through the opening in the second mentioned member with the tip projecting into the socket of the first mentioned member to align the members for interengagement between the threaded stud and the threaded portion of the opening.

2. A fastening device comprising a first fastening member formed with a threaded stud and an unthreaded guide socket extending inwardly at the end thereof, and a second fastening member in the form of an elongated sleeve with a guide opening extending completely therethrough, a portion of the opening being circular and threaded and being interengaged with the threaded stud, and another portion of the opening being non-circular and being of smaller diameter than the threaded portion of the opening.

3. The combination of a fastening device and a guide tool to be used in assembling the fastening device, said tool being formed with a non-circular shank and a circular tip of reduced diameter at the end thereof and the fastening device comprising a first fastening member formed with a threaded stud and a socket of a size to accommodate the tip extending inwardly at the end of the stud and a second fastening member in the form of an elongated sleeve with an opening extending completely therethrough, a portion of the opening being circular and threaded and being interengaged with the threaded stud of the first fastening member and another portion of the opening being non-circular and of smaller diameter and conforming in cross-sectional size and shape with the shank of the guide tool, whereby the shank of the guide tool may be inserted through the opening of the second-mentioned member with the tip projecting into the socket of the first-mentioned member to align the members for interengagement.

WILLIAM DZUS.

REFERENCES CITED

The following references are of record in the file of this patent:

UNITED STATES PATENTS

| Number | Name | Date |
|---|---|---|
| 440,844 | Hallan | Nov. 18, 1890 |
| 719,559 | Brown | Feb. 3, 1903 |
| 886,299 | Kenney | Apr. 28, 1908 |
| 1,048,385 | Barstow | Dec. 24, 1912 |
| 1,708,793 | Jones | Apr. 9, 1929 |
| 1,978,935 | Douglas | Oct. 30, 1934 |
| 1,982,488 | Weber | Nov. 27, 1934 |
| 2,121,193 | Haicke | June 21, 1938 |
| 2,337,984 | Flowers | Dec. 28, 1943 |

FOREIGN PATENTS

| Number | Country | Date |
|---|---|---|
| 548,615 | Great Britain | Oct. 16, 1942 |
| 548,653 | Great Britain | Oct. 19, 1942 |
| 551,418 | France | Jan. 8, 1923 |